US006156420A

United States Patent [19]

Hösselbarth et al.

[11] Patent Number: 6,156,420

[45] Date of Patent: Dec. 5, 2000

[54] SUPPORT MATERIAL FOR IMAGE-RECORDING PROCESSES

[75] Inventors: Bernd Hösselbarth, Leipzig; Reiner Mehnert, Markkleeberg; Krista Weidig, Leipzig; Dieter Becker, Georgsmarienhütte; Rainer Gumbiowski, Wallenhorst; Wieland Sack, Bissendorf, all of Germany

[73] Assignee: Felix Schoeller Jr. Foto-und Spezialpapiere GmbH & Co. KG, Germany

[21] Appl. No.: 09/107,589

[22] Filed: Jun. 30, 1998

[30] Foreign Application Priority Data

Jul. 2, 1997 [DE] Germany ........................... 197 28 093

[51] Int. Cl.[7] ........................................................ B32B 3/26

[52] U.S. Cl. ....................... 428/304.4; 428/195; 428/913; 428/424.8; 428/480; 503/227

[58] Field of Search ................................ 428/304.4, 195, 428/913, 424.8, 480; 503/227

[56] References Cited

U.S. PATENT DOCUMENTS

| | | | |
|---|---|---|---|
| 4,268,615 | 5/1981 | Yonezawa | 430/320 |
| 4,908,345 | 3/1990 | Egashira et al. | 503/227 |
| 4,929,213 | 5/1990 | Morgan | 446/97 |
| 4,952,486 | 8/1990 | Sack et al. | 430/532 |
| 5,418,078 | 5/1995 | Desie et al. | 428/704 |
| 5,573,636 | 11/1996 | Sack et al. | 162/5 |
| 5,614,345 | 3/1997 | Gumbiowski et al. | 430/104 |
| 5,639,540 | 6/1997 | Imaeda | 428/195 |
| 5,858,603 | 1/1999 | Becker et al. | 430/138 |

FOREIGN PATENT DOCUMENTS

| | | |
|---|---|---|
| 0693384 | 1/1996 | European Pat. Off. . |
| 3901234 | 1/1989 | Germany . |

OTHER PUBLICATIONS

Patents Abstracts of Japan M–1288 Jul. 30, 1992 vol. 16, No. 353.

*Primary Examiner*—William Krynski
*Assistant Examiner*—B. Shewareged
*Attorney, Agent, or Firm*—Cook, Alex, McFarron, Manzo, Cummings & Mehler, Ltd.

[57] ABSTRACT

The invention discloses a support material for image-recording processes comprising a base material and a foam layer, wherein the foam layer consists a whipped, radiation cured foam containing tensides, still further an image-receiving material is disclosed which contains said support material in addition to a dye-receiving layer.

13 Claims, No Drawings

SUPPORT MATERIAL FOR IMAGE-RECORDING PROCESSES

BACKGROUND, SUMMARY AND DESCRIPTION OF THE INVENTION

The invention concerns a support material for image-recording processes, especially for thermal color-transfer processes, with a foam layer cross-linked by irradiation and an image-receiving material.

The reprographic processes developed in recent years (for example, dye diffusion thermal transfer or the ink-jet process), which make it possible to reproduce an image produced electronically in the form of a hard copy, are gaining increasing importance. The principle of a thermal dye-transfer process is as follows:

A digital image is prepared using the primary colors cyan, magenta, yellow and black and is converted into corresponding electrical signals, which are then transformed into heat by means of a thermal head in the printer. The effect of the heat sublimates the dye from the donor layer of a colored material in contact with the receiving material and the dye diffuses into the receiving layer.

The aim of this technology is to adjust the image quality of the color printout to the level of silver salt photography.

In addition to a smooth surface, heat and light fastness, good dye solubility and anti-blocking properties, the requirements for achieving high-quality images in terms of optical density, color tone and resolution also include the need for substantial contact to be made between the thermal head of the printer and the receiving material. If this is not guaranteed, places on the surface of the image that are not printed or fluctuations in density may result.

It is known, for example from JP 60-236794, how to coat support materials of paper with thermoplastic materials of high molecular weight, before the support layer is applied. These high molecular weight thermoplastics can be polyolefins, polystyrene, polyvinylidene chloride, polyethylene terephthalate or ionomer resins. This intermediate layer enables a substantial blocking effect to be achieved between the receiving layer and the paper support. This way, dye cannot diffuse into the support (paper) owing to heat and be carried on by materials from the paper, which is demonstrated by unclear image appearance. In addition, the unevenness of the paper surface is equalized and favorable contact guaranteed between the receiving material and the thermal head. The disadvantage is that this intermediate layer conducts the heat produced in the thermal head, and not enough dye is released and taken up by the receiving layer. The image created has insufficient color density.

To counter this problem, DE 39 34 014 proposed an intermediate layer that has a heat-insulating and simultaneously softening function. This intermediate layer contains polymer hollow microballs and a binder. The disadvantage of this layer is a dusting effect.

Another approach is to apply a thermoplastic foam layer to a support as an intermediate layer (JP 02-274592). This achieves both softness and good heat insulation. The disadvantage of this solution to the problem is that poor surface quality of the foam layer results in poor surface quality of all the receiving material. To improve this quality, a sealing layer would have to be applied to the foam layer in order to improve the surface, which in turn would have an adverse effect on the heat insulation.

In JP 04-110196, an intermediate layer is applied that is made of unsaturated compounds, is hardened using UV or electron radiation and has a foam structure. The foam layer described is made of a so-called reactive foam, in the production of which chemical compounds are used that develop gases due to the effect of heat. Because of uneven pore formation, such a foam layer has uneven heat insulation and thus uneven dye transfer, which is demonstrated by a so-called "mottle" of the image.

In JP 04-358889, an image-receiving sheet is claimed that uses a so-called additive foam. The disadvantage in the production of this foam, which works as an intermediate layer and contains an acrylic resin that can be hardened by radiation and hollow particles (little hollow balls) as a foam base, lies in the difficulty of evenly distributing the hollow particles in the polymer matrix.

A heat-sensitive recording material is known from DE 39 01 234 A1, one feature of which is an intermediate layer with a foamed portion containing tiny hollow spaces. The foam layer described is made of a so-called reactive foam and is expanded by heating.

It is therefore the problem of this invention to provide a support material for image-recording processes that enables the production of dye-receiving materials with excellent surface quality, with which images with high color density and high color brilliance and image resolution can be produced.

The problem is solved by a support material for image recording processes comprising a base material and a foam layer, wherein the foam layer consists of a whipped radiation cured foam containing tensides.

A further object of the invention is an image receiving material which comprises the aforementioned support material. In this image-receiving material at least one foam layer is arranged between a base material and a dye-receiving layer.

The bases for the tenside foam are compounds with unsaturated carbon double bonds such as acrylic, methacrylic, allyl or vinyl compounds. They can also contain hydroxyl, carboxyl and other polar groups. Especially preferred materials are those containing acrylate or methacrylate groups, such as polyol acrylates, polyester acrylates, urethane acrylates, polyether acrylates, epoxy acrylates, alkyd resin acrylates and the methacrylates corresponding to the acrylates mentioned. Water-compatible and water-soluble monomers and/or oligomer acrylates are particularly suitable.

The water compatibility of a substance specifies the amount of water that can be absorbed by that substance without phase formation. If the water/substance solubility limit is exceeded, a phase separation occurs.

It has been found that foam quality, i.e., foam volume and foam stability, increases as the water-compatibility of the acrylates increases. Examples of water-compatible acrylates include urethane acrylates, polyethylene glycol or polypropylene glycol acrylates and the ethoxylated acrylates of multifunctional alcohols of trimethylol propane and pentaerythritol.

For the tenside foam, tensides can be chosen from the group of anionic, cationic, amphoteric and non-ionic products. These include, for example, fatty acid salts (soaps), alkane sulfonates, alkyl benzene sulfonates, olefin sulfonates, fatty alcohol sulfates, fatty alcohol polyglycol sulfates, lignin sulfonates, sulfosuccinates, fatty alcohol polyglycol phosphates, gallic acids, distearyl dimethyl ammonium chloride, stearyl-N-acylamino-N-methyl imidazolinium chloride, dodecyldimethyl benzylammonium chloride, alkyl betain, N-carboxyethyl-N-alkylamidoethyl glycinate, aminoxides such as N-alkylamidopropyl-N-dimethyl aminoxide, dipalmitoyl lecithin, fatty alcohol polyglycol ethers, alkylphenol ethers, fatty acid monoglyceride, ethoxylates, or sultains. But mixtures of the compounds mentioned can also be used. Especially well suited as a tenside is a fatty acid polyethylene glycol ester. The amount of tenside in the foam layer can range from 0.3% to 5.5% by weight based on the dry weight of the layer.

In another embodiment, the coating mass in the invention also contains a foam stabilizer. Compounds suitable as foam stabilizers are fatty acid alkanol amides and their ethoxylated derivatives, water-compatible polymers like polyvinyl alcohol, polyvinyl pyrrolidone, cellulose derivatives, copolymerisates with acrylic acid and maleic acid and polyalkylene-oxide-modified polydimethyl siloxanes, but especially sugar compounds, for example D-sorbitol. The amount of stabilizer in the foam layer can range from 0.05% to 1.5% by weight based on the dry weight of the layer.

In other experiments to produce stable tenside foams, complete tenside/stabilizer systems have proven especially suitable. A complete system is understood to involve processing the tenside and the stabilizer, if necessary adding other ingredients such as stearic acid, salts or silicates and then adding them to the polymer to be foamed.

Accordingly, the tenside/stabilizer system can have the following composition:

38–51% by weight tenside

9–12% by weight stabilizer

0–8% other ingredients ad 100% by weight water

Particularly favorable results were achieved with 1% to 10% by weight and especially 2.5% to 7.5% by weight tenside/stabilizer system based on the dry weight of the coating mass.

With the, monomer (oligomer)/water/tenside or monomer (oligomer)/water/tenside/stabilizer coating mass used in the invention, it was possible to produce a tenside foam (whipped foam) with good foaming properties in terms of foam volume, bubble size and foam stability (pressure stability and standing time).

In order to increase the foam quality (foam volume, foam stability), cotensides, especially anionic cotensides can also be used. Those that proved especially suitable were cotensides that are compatible with the tenside-stabilizer system and increase the elasticity of the foam lamella, for example, Na-cocoa fatty acid-N-methyl taurinate or alkane sulfonate. The amount of cotenside can range from 0.5% to 0.8% by weight, especially 0.6% to 0.7% by weight based on the dry weight of the layer.

To increase the mechanical strength of the foam base even more, the coating mass can be mixed with a reactive cross-linking agent such as trimethylol propane triacrylate.

The tenside foam is produced by the dispersion of air, $CO_2$ or $N_2$ in the coating mass. As dispersion machines, colloid mills like the stirring machine Ultra-Turrax® that work on the rotor/stator principle can be used. Accordingly, the foam used in the invention is a mechanically produced foam.

The size of the bubbles produced ranges from 0.5 to 20 μm. A whipped foam with a bubble size of 1 to 6 μm, but particularly a size distribution from 1 to 3 μm, has especially suitable properties.

The desired foam volume is 30% to 60%, especially 45% and 50%.

The thickness of the foam layer in the invention ranges from 5 to 30 μm, especially 8 to 25 μm.

The coating mass in the invention for producing a foam layer can contain the following components, in one particular embodiment:

80–90% by weight water-compatible compounds with unsaturated double bonds,

1–10% by weight tenside system (especially 5% to 10% by weight),

1–10% by weight water.

The foam layer in the invention is applied to a base material (base layer) and cross-linked by energy-rich radiation. This radiation can be electron radiation (ER) or UV radiation. The foam mass can be applied to the base material with the usual applicators such as a metering or slot-die coater or roll coater.

As a base material, a plastic film or a coated or uncoated base paper can be used, for example. Among the uncoated papers, a base paper with a smooth compressed surface is especially appropriate. In one particular execution variant, a base paper with at least one barrier layer is used. A layer functioning as a barrier layer under the foam layer also prevents the applied foam mass from passing through to the inside of the paper and saves coating material.

The base paper is preferably made of cellulose or synthetic fibers and is equipped with other regular adhesive agents and auxiliary ingredients. It can be surface-sized and/or resin-coated.

To improve the adhesion of the foam layer to the paper support, the paper surface can be treated with corona rays.

According to the invention, the barrier layer can be produced in different ways from various materials. In one particular execution variant, the barrier layer consists of a thermoplastic polymer, preferably a polyolefin film, which is applied by extrusion coating. The thickness of the layer is 5 to 30 μm, preferably 7 to 20 μm. The polyolefin is polyethylene or polypropylene, an ionomer resin or another ethylene copolymer resin, for example.

In another embodiment of the invention, the barrier layer can be applied as an aqueous solution of a water-soluble film-forming polymer. Water-soluble polymers suitable here include, for example, polyvinyl alcohols, acrylic acids/vinyl copolymers, polyacrylamide, alginates or starch derivatives. Depending on the type of polymer, the thickness of such a barrier layer after drying is 3 to 30 μm.

In another embodiment of the invention, the barrier layer contains compounds that can be hardened by radiation (electron/UV). The materials used for this are lacquers of monomers, oligomers or prepolymers and mixtures of these. Their molecules have double carbon bonds. An acrylate layer that can be hardened by radiation is particularly appropriate for this. The layer is 3 to 20 μm thick, especially 3 to 6 μm.

To produce very brilliant images, the foam layer is cross-linked by energy-rich electron or UV rays in contact with high-gloss metal surfaces or high-gloss cylinders. That way, the surface of the support material which may be "damaged" by little bubbles that have opened the surface of the layer is "repaired".

In another embodiment of the invention, a further layer (cover layer) can be applied to the foam layer. This cover layer can be a lacquer layer that can be hardened by radiation, for which a large number of high-cross-linking (i.e., multifunctional) acrylates are suitable, whose viscosities are in the range of 80 to 200 mPa's(cP). Preferably, epoxy and polyester acrylates with acrylate diluents such as hexandiol diacrylate (HDDA), trimethylol propane triacrylate (TMPTA) or tripropylene glycol diacrylates (TPGDA) are used. The weight ratio of acrylate/acrylate diluent preferably ranges from 1:1 to 4:1.

But a thin synthetic film, for example a polyester film, laminated to the foam layer can also be used as the cover layer. To achieve special brilliance in the images produced using this support material, the cover layer can have white pigments added to it.

The cover layer can be 1 to 10 $\mu$m thick, especially 2 to 9 $\mu$m. Especially favorable results are achieved with a cover layer of a thickness from 4–6 $\mu$m (corresponds to 4–6 $g/m^2$ dry coating weight).

The adhesion of the cover layer to the foam base can be improved by corona treatment the foam surface.

The support material according to the embodiments described above is used after applying dye-receiving layers as image-receiving material for thermal-transfer processes (for example, D2T2 processes) or ink-jet processes. All suitable materials known from the literature can be used for the image-receiving layers.

The following examples shall further explain the invention.

EXAMPLE 1

Starting from the recipes listed in the following Table 1, first a whipped foam was produced using a stirring machine Ultra-Turrax S 50® (from Janke & Kunkel GmbH, Staufen) at 3,000 rpm and a stirring time from 1 to 5 minutes. In the next step, it was then applied to a lab coater using a multi-roller application system on a 135 $g/m^2$ neutrally sized calender-finished paper and a machine speed of 100 m/min. Before coating, the paper surface was corona pretreated. The coated paper was pressed with the layer side against a water-cooled high-gloss cylinder and radiated from the back of the paper by means of accelerated electrons. The foam layer was hardened with a 30 kGy dose of electron rays in an $N_2$ inert atmosphere.

TABLE 1

| Components | 1a | 1b | 1c | 1d |
|---|---|---|---|---|
| Ethoxylated TMPTA ethoxylation degree 3 | — | — | 28.6 | — |
| Ethoxylated TMPTA ethoxylation degree 20 | 80.0 | — | 28.6 | 42.85 |
| Water-diluable aliphatic urethane acrylate, functionality 2–3 | — | 85.8 | 28.6 | 42.85 |
| Tenside/stabilizer system (with 50% water) | 10.0 | 7.1 | 7.1 | 7.1 |
| Water | 10.0 | 7.1 | 7.1 | 7.1 |
| Coating weight, $g/m^2$ | 20 | 19 | 10 | 20 |

TMPTA = trimethylol propane triacrylate

The amounts in the table are expressed in % by weight and relate to the coating mass.

The subsequent coating of the paper with an image-receiving layer will be discussed later on.

EXAMPLE 2

A paper sized with stearic acid, alkyl ketene dimer and epoxy fatty acid amide with a basis weight of 135 $g/m^2$ was coated on the front with polyethylene (coating weight: 15 $g/m^2$) in the melt-extrusion process and after corona pretreatment coated with a whipped foam produced as in Example 1 according to the following recipe:

TABLE 2

| Component | 2a | 2b | 2c | 2d | 2e | 2f |
|---|---|---|---|---|---|---|
| Ethoxylated TMPTA, ethoxylation degree 3 | 28.6 | 28.9 | 14.3 | 14.3 | 13.2 | — |
| Ethoxylated TMPTA, ethoxylation degree 20 | 28.6 | 28.9 | 35.7 | 35.7 | 33.1 | 35.5 |
| Aliphatic urethane di/triacrylate, functionality 2.5 | 28.6 | 28.9 | 35.7 | 35.7 | 6.6 | 35.5 |
| Aliphatic urethane diacrylate, functionality 2 | | | | | 33.1 | 14.2 |
| Tenside/stabilizer system (with 50% water) | 7.1 | 5.8 | 7.1 | 5.7 | 5.3 | 5.6 |
| Na-coconut fatty acid-N-methyl taurinate | — | 0.6 | — | 0.6 | 0.7 | 0.7 |
| Water | 7.1 | 6.9 | 7.1 | 8.0 | 8.0 | 8.5 |
| Coating weight, $g/m^2$ | 19 | 19 | 19 | 21.5 | 19 | 19 |

The coated paper was pressed with the coated side against a water-cooled high-gloss cylinder and radiated from the back of the paper by means of accelerated electrons. The foam layer was hardened with a 25 kGy dose of electron rays in an $N_2$ inert atmosphere.

EXAMPLE 3

A 5 $g/m^2$ barrier layer of acrylates that can be hardened by radiation was applied to raw paper. It was then coated with a foam-coating mass produced as in Example 2a. The layer was hardened with electron beams with an energy dose of 30 kGy in a $N_2$-atmosphere.

EXAMPLE 4

A polyethylene-coated base paper with a basis weight of 135 $g/m^2$ (see Example 2) was coated according to the recipe in Example 2a and provided with a smoothing layer in another step. The smoothing layer was applied from a mixture of epoxy diacrylate on a base of bisphenol-A and trimethylol propane triacrylate in a ratio of 1:1 with 2% by weight of the photoinitiator 2-hydroxy-2-methyl-1-phenylpropane-1-on in a quantity of 6 $g/m^2$.

To improve adhesion, the foam base was corona-treated. The foam layer was hardened with electron beams with an energy dose of 20 kGy in an $N_2$ atmosphere, and the smoothing layer was hardened by UV radiation (Hg fusion lamp 120 W/cm).

The support material produced in this way was coated with a receiving layer to obtain an image-receiving material.

Comparative Example

For comparison, a commercially available image-receiving sheet was used. This image-receiving sheet had a support that had a pigmented oriented polyolefin film on the front and on the back side, which was laminated to a base paper. The results are given in Table 3.

Application of an Image-Receiving Layer

The support materials with the foam layer according to examples 1 to 4 were coated with the coating mass indicated below. The coating was carried out from the aqueous solution with a roller applicator to form a receiving layer.

| | |
|---|---|
| softener-containing vinyl chloride/vinyl acetate copolymer 50% aqueous dispersion | 49.5% by wt. |
| vinyl chloride/acrylic acid ester copolymer 50% aqueous dispersion | 49.5% by wt. |
| polytetrafluoroethylene 30% aqueous dispersion | 1.0% by wt. |

The machine speed was 130 m/min, the drying temperature was 110° C. The coating weight after drying was 5 to 7 g/m$^2$.

Test Results

All image-receiving materials were printed using a D2T2 printer from Mitsubishi and a Mitsubishi original color ribbon.

The color density of the individual colors in the images obtained was measured with a "Gretag®" instrument for measuring density.

Compressibility was rated by the evenness of the compressive pressure of the image-receiving material on the thermal head and the resulting print-image appearance. Grades 1 to 5 were given for this. Grade 1 stands for an evenly printed image (with no places not printed). Grade 5 is for a printed image with many places not printed.

Gloss values, were used to rate the surface quality. The gloss of the image-receiving material was measured with a Dr. Lange three-angle gloss-measuring instrument at an angle of 20°.

TABLE 3

Test Results

| | Color Density | | | | Compressibility, | Surface quality, |
|---|---|---|---|---|---|---|
| Example | Cyan | Magenta | Yellow | Black | grade | gloss |
| 1a | 1.60 | 1.49 | 1.50 | 1.60 | 2.5 | 84 |
| 1b | 1.76 | 1.75 | 1.52 | 1.60 | 1 | 68 |
| 1c | 1.60 | 1.68 | 1.48 | 1.62 | 1.5 | 81 |
| 1d | 1.75 | 1.72 | 1.53 | 1.58 | 1 | 71 |
| 2a | 1.60 | 1.68 | 1.47 | 1.63 | 1.5 | 80 |
| 2b | 1.76 | 1.75 | 1.52 | 1.60 | 1.5 | 85 |
| 2c | 1.62 | 1.66 | 1.43 | 1.52 | 1 | 78 |
| 2d | 1.72 | 1.74 | 1.52 | 1.57 | 1 | 79 |
| 2e | 1.74 | 1.74 | 1.52 | 1.60 | 1 | 72 |
| 2f | 1.75 | 1.74 | 1.52 | 1.57 | 1 | 70 |
| 3 | 1.60 | 1.68 | 1.50 | 1.63 | 1.5 | 80 |

TABLE 3-continued

Test Results

| | Color Density | | | | Compressibility, | Surface quality, |
|---|---|---|---|---|---|---|
| Example | Cyan | Magenta | Yellow | Black | grade | gloss |
| 4 | 1.72 | 1.70 | 1.50 | 1.63 | 1.5 | 90 |
| Comp. | 1.71 | 1.64 | 1.48 | 1.59 | 1 | — |

What we claim is:

1. A support material for image-recording processes comprising a base material and a foam layer, wherein the foam layer comprises a whipped, radiation cured foam containing tensides, and wherein said foam comprises water compatible and/or water soluble monomeric and/or oligomeric compounds with unsaturated carbon double bonds, and the foam layer is cross-linked by radiation.

2. The support material of claim 1, wherein the foam layer contains a water-compatible acrylate.

3. The support material of claim 1, wherein the foam layer contains foam stabilizers.

4. The support material of claim 1, wherein the foam layer contains a complete tenside/stabilizer system.

5. The support material of claim 4, wherein the amount of tenside/stabilizer system is 2.5% to 7.5% by weight, based on the weight of the foam layer.

6. The support material of claim 1, wherein the foam layer contains pores, and the bubble diameter of the pores in the foam layer is 1 to 3 $\mu$m.

7. The support material of claim 1, including barrier layer between the base material and the foam layer.

8. The support material of claim 7, wherein the barrier layer is a polyolefin layer.

9. The support material of claim 7, wherein the barrier layer contains compounds that can be hardened by radiation.

10. The support material of claim 1, including a cover layer is also arranged on the foam layer.

11. The support material of claim 10, wherein the cover layer is a laminated polyester film.

12. The support material of claim 10, wherein the cover layer is a layer that can be hardened by radiation.

13. An image-receiving material comprising a base material, at least one foam layer and a dye-receiving layer, wherein said foam layer comprises a whipped, radiation cured foam and is positioned between the base material and the dye-receiving layer, and wherein said foam comprises water compatible and/or water soluble monomeric and/or oligomeric compounds with unsaturated carbon double bonds, and the foam layer is cross-linked by radiation.

* * * * *